United States Patent
Satish et al.

(10) Patent No.: US 8,353,021 B1
(45) Date of Patent: Jan. 8, 2013

(54) DETERMINING FIREWALL RULES FOR AN APPLICATION ON A CLIENT BASED ON FIREWALL RULES AND REPUTATIONS OF OTHER CLIENTS

(75) Inventors: Sourabh Satish, Fremont, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 589 days.

(21) Appl. No.: 12/242,625

(22) Filed: Sep. 30, 2008

(51) Int. Cl.
  *H04L 29/06* (2006.01)
(52) U.S. Cl. .............................. 726/11; 726/22; 709/202
(58) Field of Classification Search .................. None
  See application file for complete search history.

(56) References Cited

U.S. PATENT DOCUMENTS

| | | | |
|---|---|---|---|
| 7,284,124 B1 | 10/2007 | Ginsberg | |
| 7,490,356 B2 | 2/2009 | Lieblich et al. | |
| 7,617,519 B2* | 11/2009 | Williams | 726/1 |
| 7,647,634 B2 | 1/2010 | Mayfield et al. | |
| 7,707,632 B2 | 4/2010 | Nath et al. | |
| 7,761,912 B2* | 7/2010 | Yee et al. | 726/11 |
| 7,788,700 B1 | 8/2010 | Feezel et al. | |
| 7,831,522 B1* | 11/2010 | Satish et al. | 705/76 |
| 7,870,609 B2* | 1/2011 | Hulten et al. | 726/22 |
| 7,917,481 B1 | 3/2011 | Kale et al. | |
| 8,087,082 B2* | 12/2011 | Bloch et al. | 726/22 |
| 8,225,406 B1* | 7/2012 | Nachenberg | 726/24 |
| 8,250,657 B1* | 8/2012 | Nachenberg et al. | 726/25 |
| 2002/0046041 A1 | 4/2002 | Lang | |
| 2004/0019807 A1* | 1/2004 | Freund | 713/201 |
| 2006/0253458 A1 | 11/2006 | Dixon et al. | |
| 2006/0253583 A1* | 11/2006 | Dixon et al. | 709/225 |
| 2007/0033636 A1* | 2/2007 | Buckley et al. | 726/1 |
| 2007/0064617 A1* | 3/2007 | Reves | 370/252 |
| 2007/0067844 A1 | 3/2007 | Williamson et al. | |
| 2007/0094260 A1 | 4/2007 | Murphy et al. | |
| 2007/0168311 A1 | 7/2007 | Genty et al. | |
| 2007/0261116 A1 | 11/2007 | Prafullchandra et al. | |
| 2008/0022384 A1* | 1/2008 | Yee et al. | 726/11 |
| 2008/0052758 A1* | 2/2008 | Byrnes | 726/1 |
| 2008/0092235 A1* | 4/2008 | Comlekoglu | 726/22 |
| 2008/0115213 A1 | 5/2008 | Bhatt et al. | |
| 2008/0120699 A1 | 5/2008 | Spear | |

(Continued)

OTHER PUBLICATIONS

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

(Continued)

*Primary Examiner* — Nathan Flynn
*Assistant Examiner* — Michael R Vaughan
(74) *Attorney, Agent, or Firm* — Fenwick & West LLP

(57) ABSTRACT

A security system monitors the trustworthiness and firewall configurations of a set of clients, where a firewall configuration comprises a set of firewall rules that control access by an application to network communication functionalities of a client. Based on the firewall rules used by other clients and the reputation of those clients, the system determines a set of default firewall rules by selecting one or more rules that are used by the more trustworthy clients. The default firewall rules are made available to other clients, which may use these default rules. This leverages community knowledge about how much network access to allow for a particular application.

20 Claims, 4 Drawing Sheets

U.S. PATENT DOCUMENTS

| | | | |
|---|---|---|---|
| 2008/0133531 A1* | 6/2008 | Baskerville et al. | 707/9 |
| 2008/0141366 A1* | 6/2008 | Cross et al. | 726/21 |
| 2008/0189788 A1 | 8/2008 | Bahl | |
| 2008/0255928 A1 | 10/2008 | Tomeny | |
| 2008/0288330 A1 | 11/2008 | Hildebrand et al. | |
| 2009/0044024 A1 | 2/2009 | Oberheide et al. | |
| 2009/0165131 A1 | 6/2009 | Treadwell | |
| 2009/0172815 A1* | 7/2009 | Gu et al. | 726/23 |
| 2009/0240769 A1* | 9/2009 | Schran | 709/203 |
| 2009/0282476 A1* | 11/2009 | Nachenberg et al. | 726/22 |
| 2009/0287819 A1 | 11/2009 | Iverson | |
| 2009/0328209 A1* | 12/2009 | Nachenberg | 726/22 |
| 2009/0328224 A1* | 12/2009 | Hernacki et al. | 726/25 |
| 2010/0031361 A1 | 2/2010 | Shukla | |
| 2010/0125911 A1 | 5/2010 | Bhaskaran | |

OTHER PUBLICATIONS

"GreenBorder", Wikipedia, 1 page, [online] [Retrieved on Dec. 31, 2008] Retrieved from the Internet <URL:http://en.wikipedia.org/w/index.php?title=GreenBorder&printable=yes>.

Ioffe, J., "To Catch a Cyberthief: How Symantec Does It," Fortune Brainstorm Tech, Sep. 14, 2009, 3 pages [Online] [Retrieved on Mar. 30, 2010] Retrieved from the Internet<URL:http://brainstormtech.blogs.fortune.cnn.com/2009/09/14/to-catch-a-cyberthief-how-symantec-does-it/>.

Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

European Extended Search Report, European Application No. 09169538.7, Oct. 25, 2010, 5 pages.

European Examination Report, European Application No. 09169538.7, Jan. 16, 2012, 4 pages.

* cited by examiner

DETERMINING FIREWALL RULES FOR AN APPLICATION ON A CLIENT BASED ON FIREWALL RULES AND REPUTATIONS OF OTHER CLIENTS

BACKGROUND

This invention relates generally to computer security software, and more particularly to configuring a firewall on a client for an application using reputation information and firewall configuration of other existing clients.

Private networks, such as those operated by businesses or other enterprises, are often connected a public network such as the Internet. The private networks typically include a firewall positioned at the intersection of the private and public networks. The firewall monitors traffic passing between the networks and blocks unauthorized and/or malicious traffic. The firewall thus prevents malicious entities on the public network from accessing the resources of the private network, and prevents entities on the private network from accessing unauthorized resources of the public network.

A more recent trend in network security is to run so-called "personal firewalls" on the computer systems used by the end-users to access the network. For example, the desktop computer utilized by an employee of an enterprise can run a personal firewall. The personal firewall monitors network activity to/from the computer and blocks malicious traffic.

An advantage of a personal firewall is that it can apply a different security policy to each process executing on the computer. When a personal firewall is first installed on a computer, the personal firewall typically detects each attempt by a process to access the network. With each attempt, the firewall presents a dialog box to the end user, saying something to the effect of: "Process X has attempted to access the Internet. Allow it to proceed?" The end-user responds to the dialog box by indicating whether the firewall should allow or block the network access. The personal firewall remembers the end-user's choices and applies the same security policy next time the process attempts to access the network.

A problem with relying on end users to establish security policies is that the end users are often not sophisticated enough to evaluate the security threat posed by a given process. A typical end user might not have any idea whether a process should be allowed to access the network. Some personal firewalls attempt to solve this problem by including additional information in the dialog box, such as the destination address and/or protocol of the access request. However, this additional information often serves to confuse the end user further. Another problem with this approach is that the personal firewall will remember and continue to apply the end user's decision, even if it was incorrect.

A security vendor may create firewall rules, which may apply to particular applications, using either or both automatic and manual processes. These firewall rules are then part of the stock configuration of the security vendor's firewall product. But whether the rules are generated automatically by the software or manually by a user, the rules may be too permissive or too restrictive. As a result, applications running on the user's client system may be wrongly allowed or wrongly denied to communicate over the network.

SUMMARY

To address the shortcoming of existing methods of configuring a firewall with rules that govern how applications on a client system may communicate over a network, an approach to determining firewall rules for a client looks at the firewall rules used by other clients and the reputation of those clients. The reputation of a client may be measured by a hygiene score, which may be a measure of a trustworthiness of the client based on historical information about the client. By monitoring the trustworthiness and firewall configurations of other existing clients, a default firewall configuration may be determined for a client, which may then apply the firewall rules to one or more applications on the client. In one embodiment, the system uses only those firewall rules for which a threshold amount of trustworthy clients use for a particular application. Beneficially, firewall rules determined in this fashion leverage on community knowledge about how much network access to allow for a particular application.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
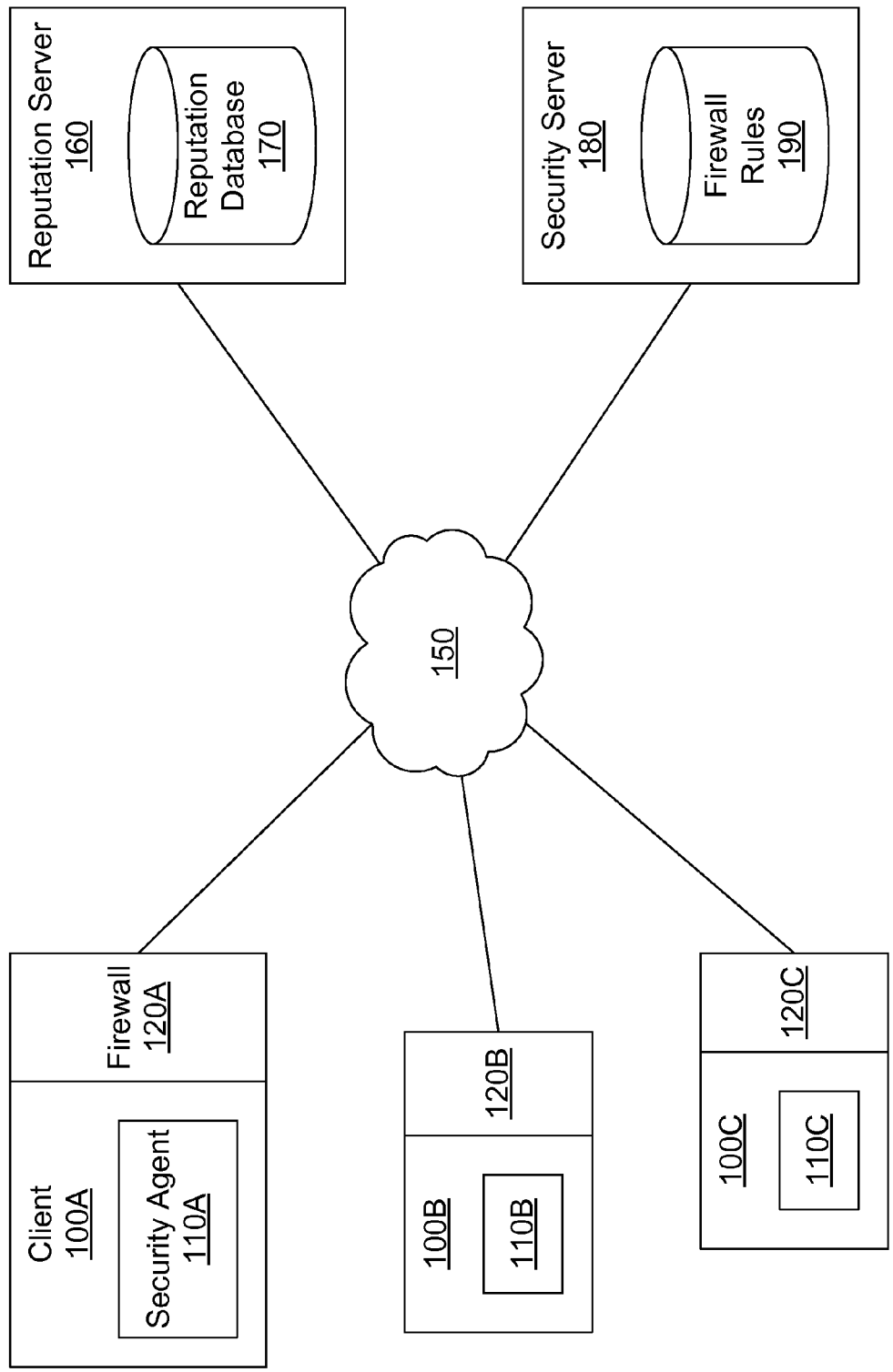
FIG. 1 is a high-level block diagram of a computing environment, in accordance with an embodiment of the invention.

FIG. 1 illustrates a network diagram including a security system for configuring a firewall for a client 100. In one embodiment, a client 100 is a computer used by one or more users to perform activities including downloading, installing, and/or executing files and browsing web sites on the network 150. The client 100, for example, can be a personal computer executing a web browser that allows the user to retrieve and display content from web servers and other computers over the network 150. In other embodiments, the client 100 is a network-capable device other than a computer, such as a personal digital assistant (PDA), a mobile telephone, a pager, a television "set-top box," or any other suitable computing device. For purposes of this description, the term "client" also includes computers such as servers and gateways that encounter files or other entities that might constitute malicious code or other threats. For example, the client 100 may be a network gateway located between an enterprise network and the Internet. The client 100 can also be a mail server or web server that stores files that can be accessed by other clients. Only three clients 100 are shown in FIG. 1 for purposes of clarity, but those of skill in the art will recognize that typical environments can have hundreds or thousands of clients.

The figures use like reference numerals to identify like elements. A letter after a reference numeral, such as "100A," indicates that the text refers specifically to the element having that particular reference numeral. A reference numeral in the text without a following letter, such as "100," refers to any or all of the elements in the figures bearing that reference numeral.

Each client 100 includes a firewall 120. In one embodiment, the firewall 120 is a so-called personal firewall and comprises a software application executed by the client 110. In other embodiments, the firewall 120 may include a hardware component in addition to, or instead of, the software application. In yet other embodiments, a client 100 lacks a firewall 120, and the functionality ascribed to the firewall 120 herein is provided by another computing. The firewall 120 applies security rules to processes executing on the computer 110, for example, to allow or prevent an application from performing a particular communication activity on a client 100.

The security system may further comprise a reputation server 160. The reputation server 160 includes or is otherwise coupled to a reputation database 170. The reputation database 170 maintains hygiene scores for entities for which a measure of reputation is tracked, as described below. The reputation server 160 provides access to the hygiene scores in the reputation database 170, for example, to one or more of the clients 100.

The security system may further comprise a security server 180, which may be a computer system used by a provider of security software to distribute software and/or data to the clients 100. In one embodiment, the security provider distributes security software, such as the security agent 110, through multiple distribution points, such as retail and online stores. The security software may contain functionality to contact the security server 180 and download new and/or updated software and data. In one embodiment, the security server 180 distributes security polices to the clients 100. The security policies may include firewall rules that each client 100 may use to configure its corresponding firewall 120. A firewall rule may apply to a particular application running on a client and may limit or allow the application to conduct network communications, either completely or partially (e.g., to disallow an application from communicating using a particular port). The security server 180 may store the firewall rules in a firewall rules database 190.

The operation and functionalities of the reputation server 160 and the security server 180 are described in more detail below.

A network 150 represents the communication pathways between the clients 100, the reputation server 160, and the security server 180. In one embodiment, the network 150 is the Internet. The network 150 can also use dedicated or private communications links that are not necessarily part of the Internet. In one embodiment, the network 150 uses standard communications technologies and/or protocols. Thus, the network 150 can include links using technologies such as Ethernet, 802.11, integrated services digital network (ISDN), digital subscriber line (DSL), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
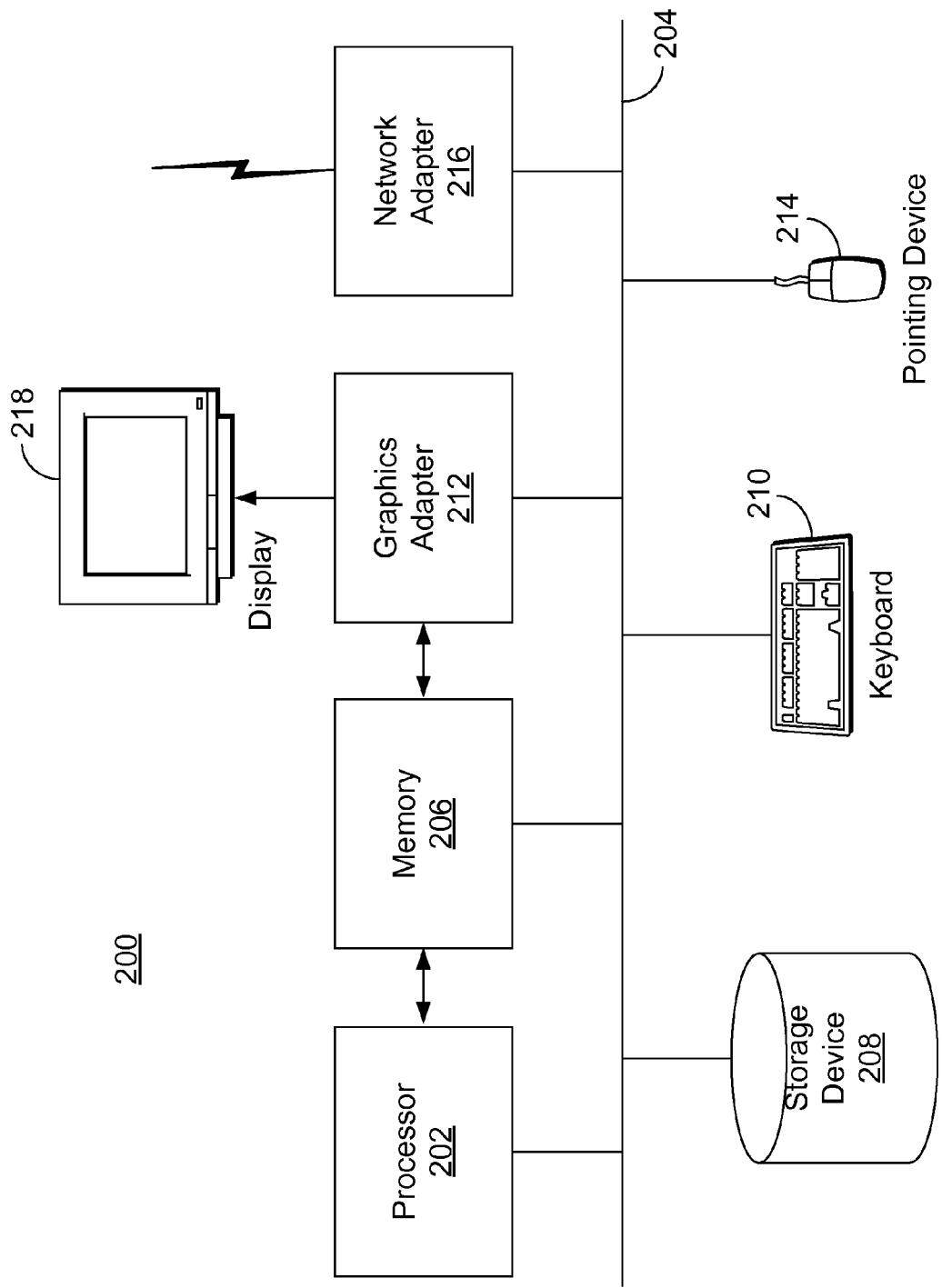
FIG. 2 is a high-level block diagram illustrating a typical computer for use as a reputation server or client, in accordance with an embodiment of the invention.

FIG. 2 is a high-level block diagram illustrating a typical computer 200, which may be used as a client 100, the reputation server 160, and/or the security server 180. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 150.

As is known in the art, the computer 200 is adapted to execute computer program modules. As used herein, the term "module" refers to computer program logic and/or data for providing the specified functionality, stored on a computer-readable storage medium and accessible by the processing elements of the computer 200. A module may be implemented in hardware, firmware, and/or software. In one embodiment, the modules are stored on the storage device 208, loaded into the memory 206, and executed by the processor 202.

The types of computer systems 200 used by the entities of FIG. 1 can vary depending on the embodiment and the processing power used by the entity. For example, a client 100 that is a mobile telephone typically has limited processing power, a small display 218, and might lack a pointing device 214. The reputation server 160 or the security server 180, in contrast, may comprise multiple blade servers working together to provide the functionalities described herein.

Figure 3:
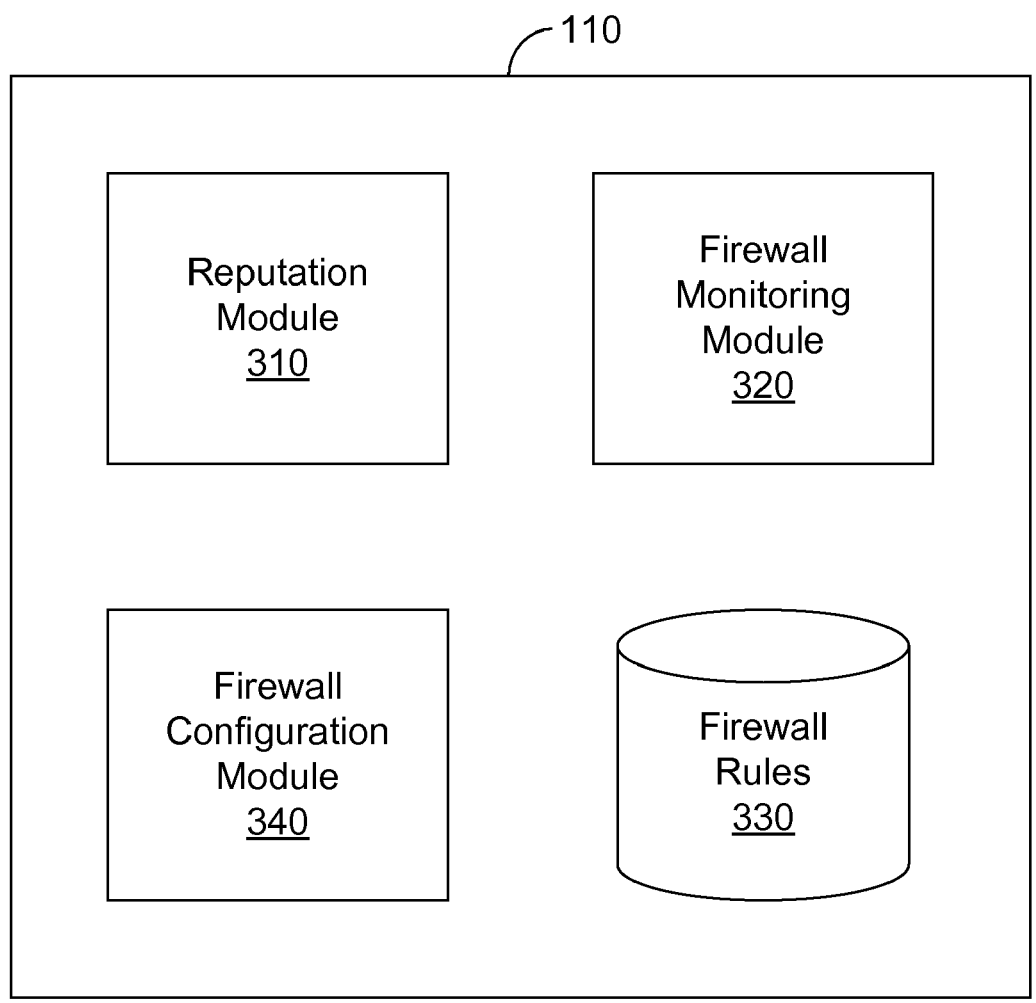
FIG. 3 is a diagram of a security software application, in accordance with an embodiment of the invention.

In one embodiment, the client 100 executes a security agent 110, which comprises a reputation module 310, as illustrated in FIG. 3. In an embodiment, the reputation module 310 monitors processes running on the client 100, where the processes may comprise malicious code. For example, the reputation module 310 may monitor actions on the client 100 such as the calling of graphics functions to display items on a display of the client 100. In addition to the security agent 110, the client 100 may also store and execute one or more other source applications on the client 100. The source applications may comprise any type of executable file, library (such as a DLL), document including a markup language, or any other file on the client 100 that includes executable code or other instructions.

The client 100 communicates over a network 150 with the reputation server 160. The reputation server 160 may also communicate with a number of other client computing systems over the network 150, for example, to maintain an online community of users for tracking the reputation of various applications and other software entities with which client computing systems may interact. U.S. application Ser. No. 11/618,215, filed Dec. 29, 2006, incorporated by reference in its entirety, describes methods and systems for computing and maintaining client hygiene scores for various client computing systems, where the hygiene score for a particular client represents an assessment of the client's trustworthiness. In this context, a client's trustworthiness may refer to the client's propensity for getting infected by malicious code and other computer related threats, and/or the ability of the user to avoid the threats. The hygiene score may be computed at the client 100 by the reputation module 310, or it may be computed by the reputation server 160, which may store the hygiene scores in the reputation database 170. In the latter case, the reputation module 310 may obtain the hygiene score for its client 100 from the reputation database 170 via network 150.

Using the hygiene scores for a community of other users associates the users' abilities to avoid threats with their decisions to engage in certain activities involving computer-related entities they encounter. This approach leverages the collective intelligence of the users to associate users that are trustworthy with the actions they take using their computing system, and thereby more accurately measure the risks associated with various activities. The hygiene scores may be used to judge certain activities without requiring the users to evaluate or judge the activities explicitly, and without requiring a sophisticated analysis of those activities. Therefore, the approach is well-suited to a computing environment where there are significant amounts of malware or other threats that might not be identified using conventional techniques.

FIG. 3 illustrates an embodiment of the security agent 110, stored on and executed by a client 100. The security agent 110 comprises a reputation module 310, a firewall monitoring module 320, a firewall configuration module 340, and a firewall rules database 330. The firewall monitoring module 310 is configured to detect any change in the configuration of the firewall 120 associated with the client 100. In one embodiment, the firewall configuration comprises a set of firewall rules, which may be stored in a firewall rules database 330. The firewall configuration module 340, described in more detail below, is configured to communicate with the security server 180 and to apply new firewall rules or change existing ones in the database 330, thereby configuring the firewall 120 for the client 100 based on instructions from the security server 180.

As described in the following, illustrated in FIG. 4, embodiments of the security agent 110 configure a firewall 120 associated with a client 100 with one or more firewall rules for an application using the reputation information and firewall configuration of other existing clients. The operations described in FIG. 4 may be performed by the security agent 110 on the client 100; however, the actions need not be performed all by one entity or software module. Any combination of software modules may be used to implement the functionalities of the security agent 110, some of which may be executed by a system other than the client 100 in communication with the client 100.

To allow the security system to make decisions about what firewall rules to use as default rules for other systems, the security server 180 accumulates information about what rules are being used by which clients 100. Accordingly, clients 100 monitor their own firewall configuration and communicate that information to the security server 180. As illustrated in FIG. 4, for example, the firewall monitoring module 320 of client 100A detects 402 a new firewall rule applied to the firewall 120A of that client 100A. This new firewall rule may be a completely new rule, or it may be a change to or deletion of an existing firewall rule. In one embodiment, the firewall rule is specific to a particular application on the client 100A. The reputation module 310 of the client 100A also determines 404 the hygiene score of the client 100A to obtain a measure of the client's trustworthiness. As described above, the reputation module 310 may computer the hygiene score or may obtain it from a reputation server 160. The client 100A then sends 406 the new firewall rule and the hygiene score to the security server. Similarly, client 100B performs this process when it detects 402 a new firewall rule applied to its firewall 120B.

Figure 4:
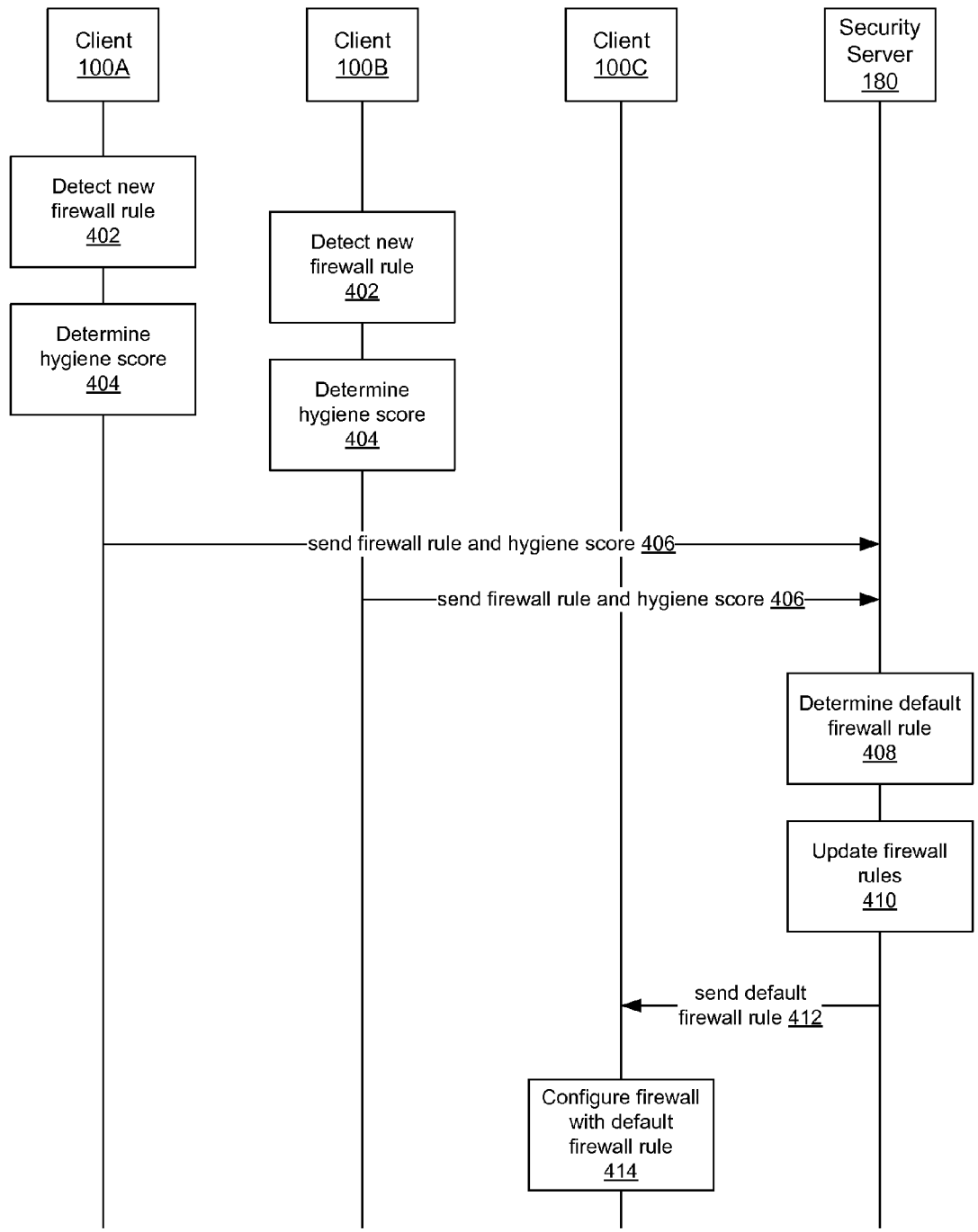
FIG. 4 is a flow diagram of a method for configuring a firewall on a client, in accordance with an embodiment of the invention.

Although only two clients are illustrated in FIG. 4 providing information to the security server 180, in practice a much larger number of client would generally be providing this information. More information about clients' firewall configurations and their hygiene scores will tend to enable the security server 180 to make better decisions about which firewall rules to use and which to discard. The clients 100 may perform steps 402, 404, and 406 upon any detection of a change in a firewall configuration, or it may be done at regular time intervals. Alternatively, the clients 100 may accumulate a number of new firewall rules before communicating them to the security server 180, thereby reducing network traffic.

The security server 180 receives the firewall configuration and hygiene information for a number of clients 100 and then determines 408 one or more default firewall rules based on this information. In one embodiment, the security server 180 either accepts or discards new firewall rules based on whether the hygiene scores of the clients 100 that submitted the new firewall rule meet a set of threshold criteria. The threshold criteria may require, inter alia, that at least a predetermined number or fraction of clients 100 using the rule have a minimum hygiene score, or that the average hygiene scores for the clients 100 using a particular rule be above a minimum. It can be appreciated that there are many other criteria that may be used, instead of or in addition to this one, to evaluate whether the usage of the firewall rule by the clients 100, of varying degrees of trustworthiness, indicates that the rule is a good one that should be used.

If a new firewall rule does not meet the criteria used by the security server 180, the rule may simply be discarded. Alternatively, it may be saved in the firewall rules database 190 so that the rule can be reevaluated at a later time, e.g., after information from additional clients 100 has been obtained for the rule. In one embodiment, records in the firewall rules database 190 identify a firewall rule, an application to which the rule is to be applied, and identify the hygiene scores of clients 100 that use the rule.

If a new firewall rule does satisfy the threshold criteria, the security server 180 updates 410 the default firewall rules by saving the accepted rule in the firewall rules database 190. These default firewall rules may then be used to configure for future clients 100, e.g., as default firewall rules that may or may not be manually changed, or otherwise distributed clients 100 for use in their firewall configuration. In addition, these automatically created default firewall rules can still be vetted by the security software vendor, or they can be shared as community rules with less validation.

In a simple case of distribution of a firewall rule, the security server 180 sends 412 a default firewall rule to client 100C, and client 100C. This action may be triggered by any number of activities. For example, client 100C may be updating its firewall 120C, in which case client 100C may request the security server 180 for the default rules for one or more applications. Alternatively, client 100C may be installing a new application, or simply executing an application, and the client 100C thus requests the security server 180 for any default firewall rules corresponding to the new application.

In one embodiment, for each rule that the security server 180 determines should be used, the server 180 distributes the rule to one or more clients 100. This distribution may happen in many ways. First, the security vendor may be able to select which applications are most popular and automatically include the default firewall rules associated with those applications in the product stock configuration of the firewall 120 (e.g., in the box, or in any other form in which the software is originally distributed). Alternatively, the security agent 110 can query the security server 180 for the firewall rules for an application that does not have a stock rule (or if the security agent 110 otherwise determines a need to query, such as after period of time).

In embodiments of the invention, the firewall rules for a particular application can be made available even before the application is launched, but as soon as it is created on the client 100. This may improve user experience, in contrast to a system in which firewall rules are created just in time when the application is requesting to communicate over the network, since the approach described herein need not hinder, block, or slow down runtime execution. This is because a "good" default firewall rule can be created on the system as soon as the application is installed, in stead of during runtime.

In one embodiment, the security agent 110 periodically consults the security server 180 to determine whether any of the firewall rules for an application have changed. If any rules have changed, the security agent 110 downloads the new rules and configures the firewall 120 using the updated rules. In this way, clients 100 can maintain better security postures in an ongoing fashion. Any firewall rule that was previously created on the basis of the user population and information at that time, but has now changed because of changing application user population, can be updated automatically and continually. Alternatively, the security vendor may provide an overriding change to any updated firewall rules on the basis of analysis, either manual or automated.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing a firewall rule for an application, the method comprising:
   receiving firewall rules from a plurality of clients, wherein each firewall rule regulates access by the application to one or more network communication functionalities;
   determining measures of trustworthiness for the plurality of clients from which the firewall rules are received, wherein determining a measure of trustworthiness for a client comprises determining a hygiene score indicating the client's propensity for getting infected by malicious code;
   determining at least one default firewall rule for the application based on the received firewall rules and the measures of trustworthiness for the plurality of clients from which the firewall rules are received; and
   providing the default firewall rule to a security agent executing on a second client, the security agent configured to configure a firewall using the provided default firewall rule.

2. The method of claim 1, wherein determining the measure of trustworthiness for the client comprises receiving the hygiene score from the client.

3. The method of claim 1, wherein determining the measure of trustworthiness for the client comprises receiving the hygiene score from a reputation server.

4. The method of claim 1, wherein determining at least one default firewall rule comprises:
   applying one or more threshold criteria to hygiene scores associated with the plurality of clients from which the firewall rules are received.

5. The method of claim 1, wherein determining at least one default firewall rule comprises:
   identifying a set of trustworthy clients from the plurality of clients from which the firewall rules are received, the trustworthy clients having hygiene scores above a threshold; and
   selecting as a default firewall rule a firewall rule used by one or more of the trustworthy clients.

6. The method of claim 1, wherein determining at least one default firewall rule comprises:
   identifying a set of trustworthy clients from the plurality of clients from which the firewall rules are received, the trustworthy clients having hygiene scores above a threshold; and
   selecting as a default firewall rule a firewall rule used by a threshold amount of the trustworthy clients.

7. The method of claim 1, wherein providing the default firewall rule to the security agent comprises:
   sending the default firewall rule via a computer network to the second client executing the security agent.

8. The method of claim 1, wherein providing the default firewall rule to the security agent comprises:
   loading the default firewall rule with the security agent on a computer program product stored on a computer readable storage medium.

9. The method of claim 1, further comprising:
receiving additional firewall rules from the plurality of clients; and
responsive to the additional firewall rules, updating the at least one default firewall rule.

10. A computer program product for providing a firewall rule for an application, the computer program product comprising a non-transitory computer-readable storage medium containing computer program code that comprises:
a reputation module configured to determine a measure of trustworthiness for a client, wherein determining the measure of trustworthiness for the client comprises determining a hygiene score indicating the client's propensity for getting infected by malicious code;
a firewall monitoring module configured to detect a firewall rule used by the client for a firewall of the client, the firewall rule regulating access by the application to one or more network communication functionalities of the client; and
a firewall configuration module configured to communicate the detected firewall rule and the hygiene score of the client to a remote system, and further configured to receive a default firewall rule determined based at least in part on the hygiene score of the client from the remote system and configure the firewall using the default firewall rule.

11. The computer program product of claim 10, wherein the hygiene score is based at least in part on a function of historical information about the client.

12. A computer system for providing a firewall rule for an application, the computer system comprising:
a non-transitory computer-readable storage medium storing executable computer program instructions for:
receiving firewall rules from a plurality of clients, wherein each firewall rule regulates access by the application to one or more network communication functionalities;
determining measures of trustworthiness for the plurality of clients from which the firewall rules are received, wherein determining a measure of trustworthiness for a client comprises determining a hygiene score indicating the client's propensity for getting infected by malicious code;
determining at least one default firewall rule for the application based on the received firewall rules and the measures of trustworthiness for the plurality of clients from which the firewall rules are received; and
providing the default firewall rule to a security agent executing on a second client, the security agent configured to configure a firewall using the provided default firewall rule; and
a processor for executing the computer program instructions.

13. The computer system of claim 12, wherein determining the measure of trustworthiness for the client comprises receiving the hygiene score from the client.

14. The computer system of claim 12, wherein determining the measure of trustworthiness for the client comprises receiving the hygiene score from a reputation server.

15. The computer system of claim 12, wherein determining at least one default firewall rule comprises:
applying one or more threshold criteria to hygiene scores associated with the plurality of clients from which the firewall rules are received.

16. The computer system of claim 12, wherein determining at least one default firewall rule comprises:
identifying a set of trustworthy clients from the plurality of clients from which the firewall rules are received, the trustworthy clients having hygiene scores above a threshold; and
selecting as a default firewall rule a firewall rule used by one or more of the trustworthy clients.

17. The computer system of claim 12, wherein determining at least one default firewall rule comprises:
identifying a set of trustworthy clients from the plurality of clients from which the firewall rules are received, the trustworthy clients having hygiene scores above a threshold; and
selecting as a default firewall rule a firewall rule used by a threshold amount of the trustworthy clients.

18. The computer system of claim 12, wherein providing the default firewall rule to the security agent comprises:
sending the default firewall rule via a computer network to the second client executing the security agent.

19. The computer system of claim 12, wherein providing the default firewall rule to the security agent comprises:
loading the default firewall rule with the security agent on a computer program product stored on a computer readable storage medium.

20. The computer system of claim 12, further comprising:
receiving additional firewall rules from the plurality of clients; and
responsive to the additional firewall rules, updating the at least one default firewall rule.

* * * * *